United States Patent
Tsai et al.

(10) Patent No.: US 9,255,788 B1
(45) Date of Patent: Feb. 9, 2016

(54) MEASURING METHOD FOR LINEAR STAGE

(71) Applicant: METAL INDUSTRIES RESEARCH & DEVELOPMENT CENTRE, Kaohsiung (TW)

(72) Inventors: Hsiu-An Tsai, Tainan (TW); Nai-Chun An, Kaohsiung (TW)

(73) Assignee: METAL INDUSTRIES RESEARCH & DEVELOPMENT CENTRE, Kaohsiung (TW)

( * ) Notice: Subject to any disclaimer, the term of this patent is extended or adjusted under 35 U.S.C. 154(b) by 0 days.

(21) Appl. No.: 14/568,362

(22) Filed: Dec. 12, 2014

(51) Int. Cl.
  *G01B 11/14* (2006.01)
  *G01B 11/04* (2006.01)
  *G01B 11/02* (2006.01)

(52) U.S. Cl.
  CPC .............. *G01B 11/04* (2013.01); *G01B 11/026* (2013.01)

(58) Field of Classification Search
  CPC ........... G01B 2290/45; G01B 9/02021; G01B 9/02027; G01B 9/02061; G03F 7/70775
  USPC ................................................. 356/614–640
  See application file for complete search history.

(56) References Cited

U.S. PATENT DOCUMENTS

2006/0077396 A1* 4/2006 Park .................... G03F 7/70775
                                                          356/500

* cited by examiner

*Primary Examiner* — Tri T Ton
(74) *Attorney, Agent, or Firm* — Jackson IPG PLLC; Demian K. Jackson

(57) ABSTRACT

A measuring method for linear stage used for measuring a displacement volume of a linear stage includes a light source, a two-dimensional grating, a quadrant photodiode and a processor. The light source provides an incident light, and the two-dimensional grating is disposed in light path of the incident light and reflects the incident to form a reflection light. The quadrant photodiode is disposed in light path of the reflection light and receives the reflection light for generating a plurality of sensing signals. The processor receives the sensing signals and utilizes the sensing signals to calculate a slope signal by a slope signal equation of the two-dimensional grating and an initial position signal and an end position signal by a position signal equation of the two-dimensional grating. The processor obtains the displacement volume of the linear stage by the slope signal, the initial position signal and the end position signal.

11 Claims, 6 Drawing Sheets

MEASURING METHOD FOR LINEAR STAGE

FIELD OF THE INVENTION

The present invention is generally relating to a measuring method, particularly relates to the measuring method for linear stage.

BACKGROUND OF THE INVENTION

Conventional measurement and positioning for linear stage constantly performs mensuration by utilizing a laser interferometer, an optical scale, an autocollimator or an electronic level. However, the mentioned measurement devices are not suitable to install on precise positioning machinery for on-line measurement as a result of heavy overall structure.

Conventional measurement method of the laser interferometer utilizes a way of optical interference to proceed with off-line correction. The procedures of optical interference are: splitting a light beam, making two splitting light beams traveled in two different light paths to reach corresponding reflective mirrors, reflecting the light beams to reach an optical detector by reflective mirrors therefore producing interference pattern through path difference between two traveled light beams, and converting interference pattern into straightness error eventually. However, the laser interferometer is only used for calculating and correcting in off-line mode so the laser interferometer can not satisfy the demand of on-line instantaneous measurement of linear stage.

SUMMARY

The primary object of the present invention is to make an incident light from a light source disposed at a moving stage illuminating a two-dimensional grating disposed at a guiding rail, wherein a reflection light of the two-dimensional grating forms a light spot on a quadrant photodiode therefore making the quadrant photodiode generating a plurality of sensing signals. The intensity and angle of the light spot are variable according to the movement of the stage thus further altering the intensity of the sensing signals of the quadrant photodiode. Therefore, an axial motion displacement volume and a radial displacement volume of the linear stage are calculated by using a slope signal equation and a position signal equation to calculate the sensing signals of the quadrant photodiode. Eventually, a straightness error of linear stage is obtained.

A measurement device for linear stage of the present invention is used for measuring a displacement volume of a linear stage includes a light source, a two-dimensional grating, a quadrant photodiode and a processor. The light source provides an incident light, and the two-dimensional grating is disposed in light path of the incident light and reflects the incident light to form a reflection light. The quadrant photodiode is disposed in light path of the reflection light and receives the reflection light for generating a plurality of sensing signals. The processor receives the sensing signals and utilizes the sensing signals to calculate a slope signal by a slope signal equation of the two-dimensional grating. And the processor utilizes the sensing signals to obtain an initial position signal and an end position signal by a position signal equation of the two-dimensional grating, wherein the processor obtains the displacement volume of the linear stage based on the slope signal, the initial position signal and the end position signal.

In present invention, a rank number of the slope signal is obtained by a simple signal analysis, and the displacement volume of the linear stage is obtained by congruent rank displacement volume and slope displacement volume corresponded to the rank number of the slope signal. Owing to simplified and rapid calculation, the measuring method for linear stage of present invention is suitable to measure the displacement and the straightness error of the linear stage on line therefore instantaneously controlling the linear stage by information feedback.

DETAILED DESCRIPTION OF THE INVENTION

Figure 1:
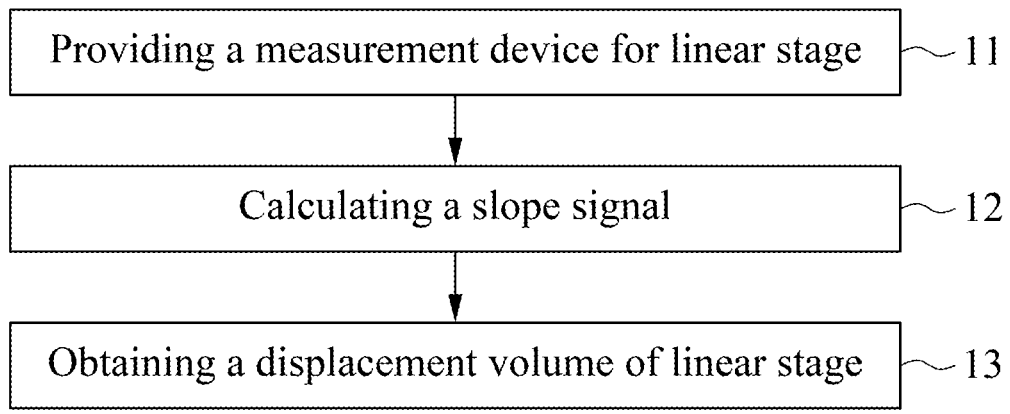
FIG. 1 is a flow diagram illustrating a measuring method for linear stage in accordance with an embodiment of the present invention.
Figure 2:
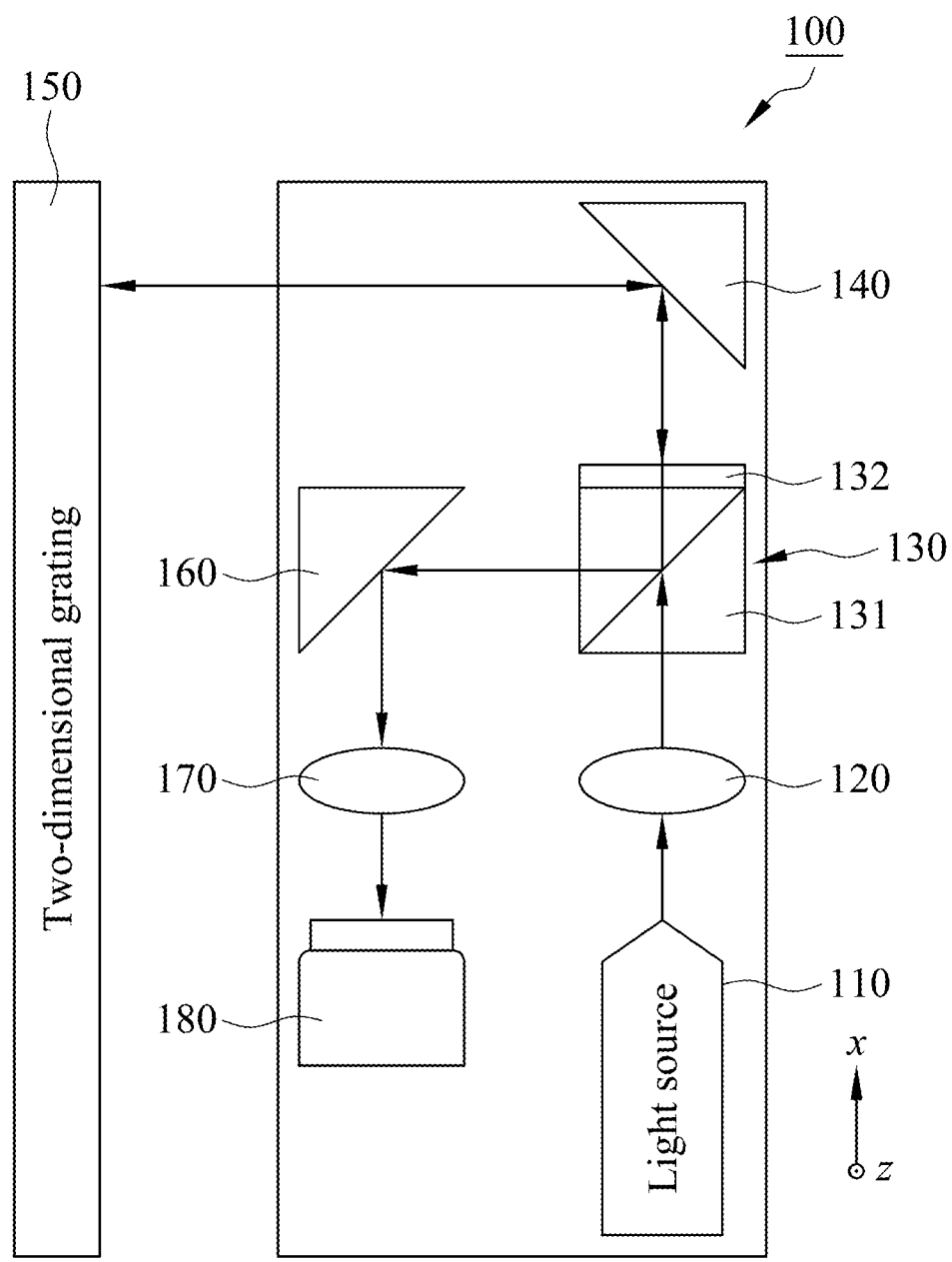
FIG. 2 is a block diagram illustrating a measurement device for linear stage in accordance with the embodiment of the present invention.
Figure 3:
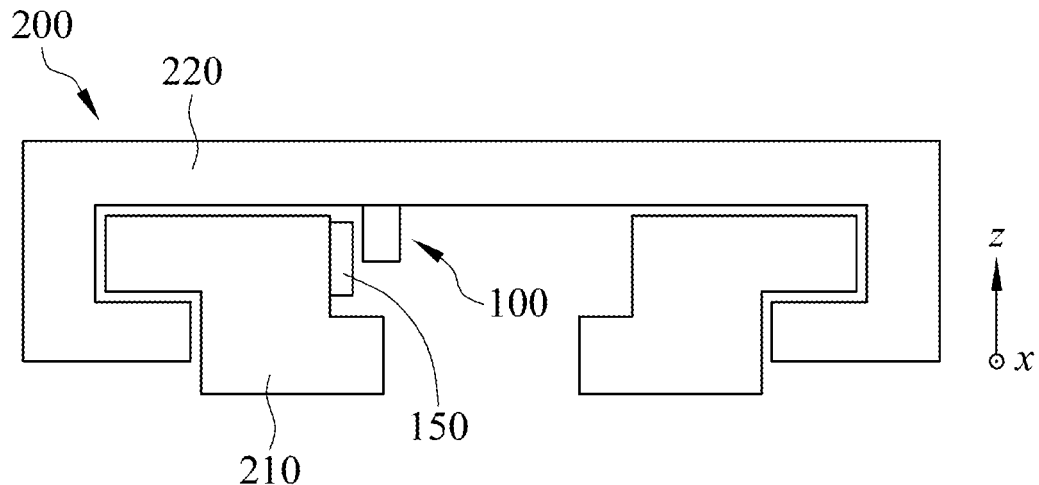
FIG. 3 is a diagram illustrating the measurement device for linear stage disposed at a linear stage in accordance with the embodiment of the present invention.

With reference to FIGS. 1, 2 and 3, a measuring method for linear stage 10 and a measurement device 100 for linear stage of the present invention used for measuring a displacement volume of a linear stage 200 are illustrated in mentioned figures. With reference to FIG. 1, provides the measurement device 100 for linear stage in a step 11 of providing the measurement device for linear stage. With reference to FIG. 2, in this embodiment, the measurement device 100 for linear stage includes a light source 110, a collimator lens 120, a polarization-splitting device 130, a first reflection device 140, a two-dimensional grating 150, a second reflection device 160, a focal lens 170 and a quadrant photodiode 180.

With reference to FIG. 2, the light source 110 provides an incident light, preferably, the light source 110 is a laser light. The collimator lens 120 disposed in the light path of the incident light is located between the light source 110 and the polarization-splitting device 130. The collimator lens 120 is used for converting the incident light into collimated beam to prevent the incident light from dispersing in the light path. The polarization-splitting device 130 is disposed in the light path of the incident light and comprises a polarization beam splitter 131 and a quarter-wave plate 132, wherein the polarization beam splitter 131 is used for guiding the incident light to the two-dimensional grating 150. In this embodiment, the incident light penetrates the polarization beam splitter 131 and reaches to the quarter-wave plate 132, wherein the quarter-wave plate 132 is used for polarizing the incident light.

Figure 4:
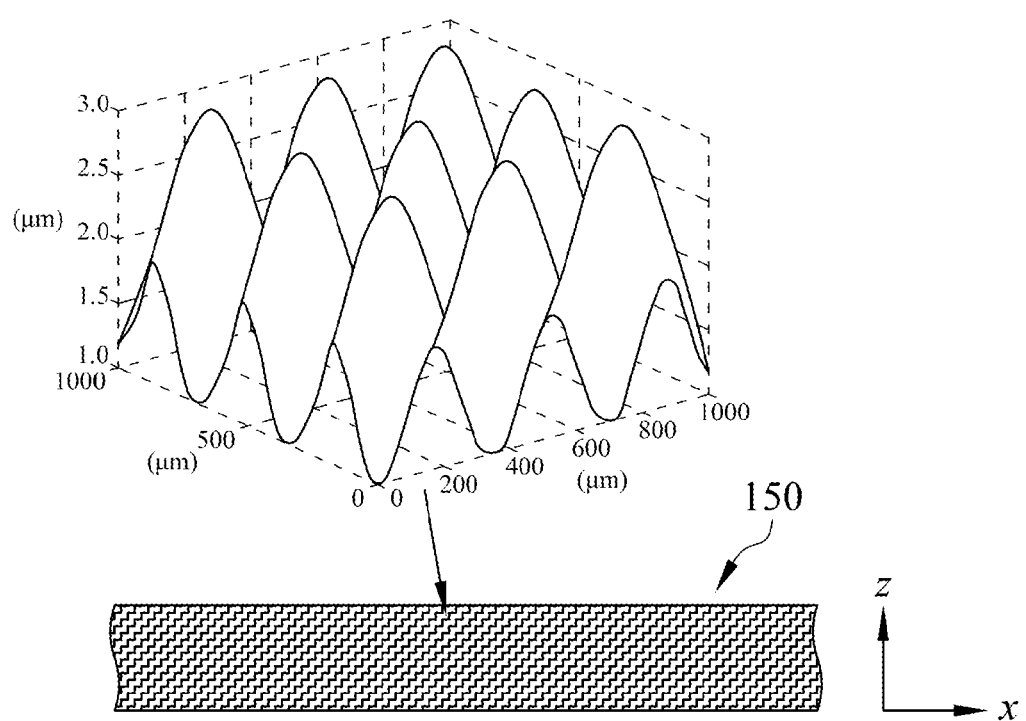
FIG. 4 is a diagram illustrating a two-dimensional grating in accordance with the embodiment of the present invention.

With reference to FIG. 2, the first reflection device 140 is disposed between the polarization-splitting device 130 and the two-dimensional grating 150 and guides the incident light from the polarization-splitting device 130 to the two-dimensional grating 150. In this embodiment, the first reflection device 140 is a reflective mirror. The two-dimensional grating 150 is disposed in the light path of the incident light and reflects the incident light to form a reflection light. With reference to FIG. 4, preferably, the two-dimensional grating 150 is a reflective-type two-dimensional sinusoidal grating, wherein a profile equation of the reflective-type two-dimensional sinusoidal grating is expressed as:

$$h(x, z) = -A_x \cos\left(\frac{2\pi x}{P_x}\right) - A_z \cos\left(\frac{2\pi z}{P_z}\right),$$

wherein h(x,z) is the profile equation of the reflective-type two-dimensional sinusoidal grating, $A_{x,z}$ are sinusoidal amplitudes of an x-axis direction and a z-axis direction of the reflective-type two-dimensional sinusoidal grating separately, $P_{x,z}$ are sinusoidal wavelengths of the x-axis direction and the z-axis direction of the reflective-type two-dimensional sinusoidal grating separately, x and z indicate the location of the x-axis direction and the z-axis direction separately. In this embodiment, $A_x = A_z = 0.5$ μm, $P_x = P_z = 350$ μm. Separately performing partial differentiation to x and z of the two-dimensional grating 150 to obtain the slope equations of the x-axis direction and the z-axis direction of the two-dimensional grating 150 as followed:

$$\theta_x(x, z) = \frac{\partial h(x, z)}{\partial x} = \frac{2\pi A_x}{P_x} \sin\left(\frac{2\pi x}{P_x}\right)$$

$$\theta_z(x, z) = \frac{\partial h(x, z)}{\partial z} = \frac{2\pi A_z}{P_z} \sin\left(\frac{2\pi z}{P_z}\right)$$

By mentioned equations, the slope equations of the x-axis direction and the z-axis direction of the two-dimensional grating 150 merely relates to the data of the x-axis direction and the z-axis direction. Therefore, slope signals of the x-axis direction and the z-axis direction of the two-dimensional grating 150 can be calculated individually.

With reference to FIG. 2, owing to the reason that the reflection light reflected from the two-dimensional grating 150 reflects along the original light path, therefore, the first reflection device 140 and the polarization-splitting device 130 located in the light path of the incident light are also located in the light path of the reflection light. Thus, the first reflection device 140 guides the reflection light from the two-dimensional grating 150 to the polarization-splitting device 130. The reflection light is polarized by the quarter-wave plate 132 and is guided to the quadrant photodiode 180 by polarization beam splitter 131. In this embodiment, the direction of the reflection light is changed by reflection of the polarization beam splitter 131.

Referring to FIG. 2, the second reflection device 160 is disposed between the polarization-splitting device 130 and the focal lens 170 and guides the reflection light from the polarization-splitting device 130 to the focal lens 170. In this embodiment, the second reflection device 160 is a reflective mirror. The focal lens 170 is located between the two-dimensional grating 150 and the quadrant photodiode 180 for making the reflection light form a light spot LS focusing on the quadrant photodiode 180.

Figure 5:
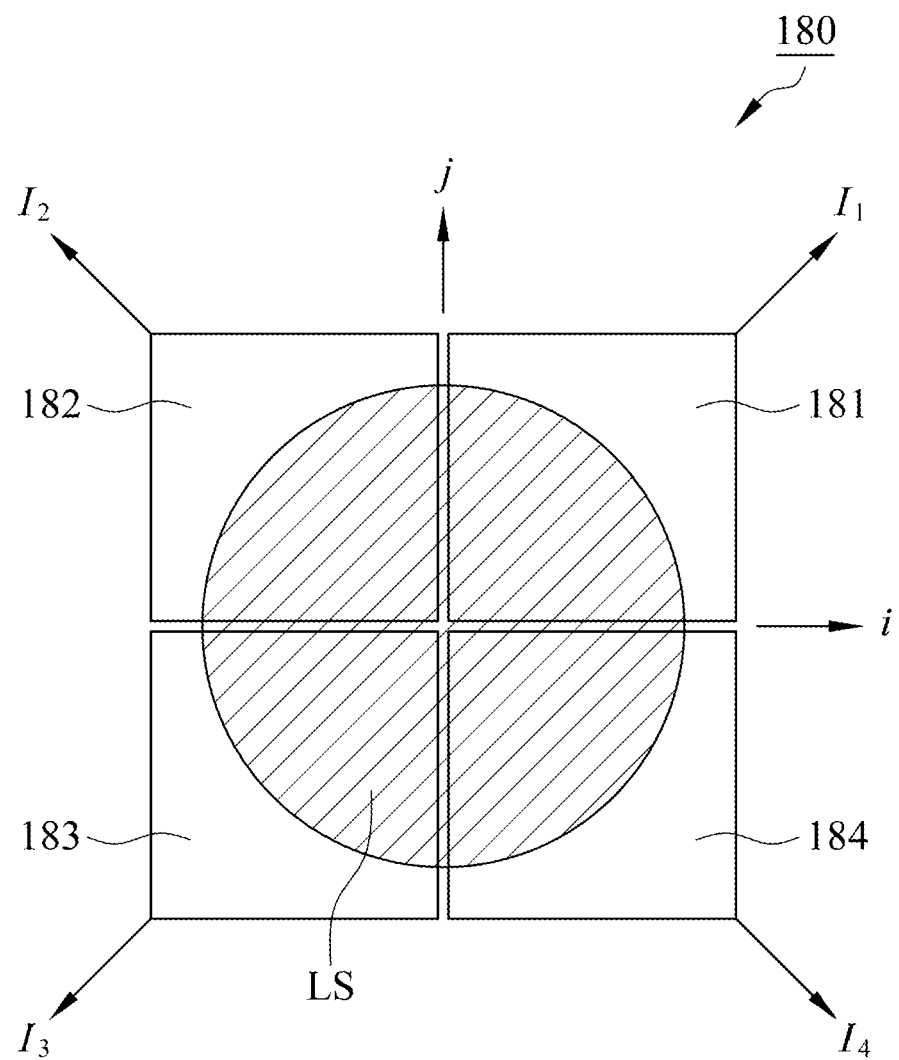
FIG. 5 is a diagram illustrating a light spot illuminating at a quadrant photodiode in accordance with the embodiment of the present invention.

With reference to FIGS. 2 and 5, the quadrant photodiode 180 is disposed in the light path of the reflection light and receives the focusing reflection light to generate a plurality of sensing signals $I_1$, $I_2$, $I_3$ and $I_4$. With reference to FIG. 5, the diagram indicates the light spot LS illuminates the quadrant photodiode 180. The quadrant photodiode 180 comprises a first-quadrant sensing unit 181, a second-quadrant sensing unit 182, a third-quadrant sensing unit 183 and a fourth-quadrant sensing unit 184, wherein a i-axis and a j-axis are defined by the quadrant photodiode 180. In this embodiment, when the spot light LS illuminates the first-quadrant sensing unit 181, the second-quadrant sensing unit 182, the third-quadrant sensing unit 183 and the fourth-quadrant sensing unit 184, each of those mentioned sensing units generates an electric current signal respectively, or in other embodiment, each of those mentioned sensing units generates a voltage signal respectively. The electric current signals are exactly the sensing signals $I_1$, $I_2$, $I_3$ and $I_4$, wherein the sensing signals $I_1$, $I_2$, $I_3$ and $I_4$ are directly proportional to the size of illumination area of the light spot LS on the first-quadrant sensing unit 181, the second-quadrant sensing unit 182, the third-quadrant sensing unit 183 and the fourth-quadrant sensing unit 184. Therefore, a i-axis position of the light spot LS on the quadrant photodiode 180 is expressed as:

$$S_i = \frac{I_2 + I_3 - I_1 - I_4}{I_1 + I_2 + I_3 + I_4}$$

A j-axis position of the light spot LS on the quadrant photodiode 180 is expressed as:

$$S_j = \frac{I_1 + I_2 - I_3 - I_4}{I_1 + I_2 + I_3 + I_4}$$

Wherein $I_1$ is the sensing signal sensed by the first-quadrant sensing unit 181, $I_2$ is the sensing signal sensed by the second-quadrant sensing unit 182, $I_3$ is the sensing signal sensed by the third-quadrant sensing unit 183, and $I_4$ the sensing signal sensed by a fourth-quadrant sensing unit 184.

The diameters in the i-axis direction and the j-axis direction of the light spot LS focusing on the quadrant photodiode 180 are:

$$d_{is} = \frac{2.44 f \lambda}{D_X}$$

$$d_{js} = \frac{2.44 f \lambda}{D_Z}$$

Wherein $d_{is}$ is the diameter in the i-axis direction of the light spot LS, $d_{js}$ is the diameter in the j-axis direction of the light spot LS, f is the focal distance of the focal lens 170, λ is the wavelength of the incident light, $D_X$ is an X-axis diameter of the incident light (X-axis is relative to the i-axis of the quadrant photodiode 180), and $D_Z$ is a Z-axis diameter of the incident light (Z-axis is relative to the j-axis of the quadrant photodiode 180). Owing to the reason that the sensing signals $I_1$, $I_2$, $I_3$ and $I_4$ are directly proportional to the size of illumination area of the light spot LS on the first-quadrant sensing unit 181, the second-quadrant sensing unit 182, the third-quadrant sensing unit 183 and the fourth-quadrant sensing unit 184, therefore, the i-axis position and the j-axis position of the quadrant photodiode 180 can be also expressed as:

$$S_i = \frac{8 D_X \theta_Z}{1.22 \pi \lambda}, \quad S_j = \frac{8 D_Z \theta_X}{1.22 \pi \lambda}$$

Through conversion, a slope signal equation of the two-dimensional grating 150 is expressed as:

$$\theta_x = \frac{1.22\pi\lambda S_j}{8D_Z}, \theta_Z = \frac{1.22\pi\lambda S_i}{8D_X},$$

Wherein $\theta_x$ is an x-axis slope signal of the two-dimensional grating 150, $\lambda$ is the wavelength of the incident light, $S_j$ is the j-axis position of the light spot LS, $D_Z$ is the Z-axis diameter of the reflection light, $\theta_z$ is a z-axis slope signal of the two-dimensional grating 150, $S_i$ is the i-axis position of the light spot LS, and $D_X$ is the X-axis diameter of the reflection light. A position signal equation of the two-dimensional grating 150 is obtained by substituting the x-axis slope signal and the z-axis slope signal of the two-dimensional grating 150 into the slope equation of the x-axis and the z-axis of the two-dimensional grating 150 to solve x and y, wherein a position signal equation of the two-dimensional grating 150 are listed as below:

$$x = \frac{P_x}{2\pi}\sin^{-1}\left(\frac{1.22\pi\lambda P_x S_i}{16\pi A_x D_X}\right), z = \frac{P_z}{2\pi}\sin^{-1}\left(\frac{1.22\pi\lambda P_z S_j}{16\pi A_z D_Z}\right)$$

Wherein x is an x-axis position signal of the two-dimensional grating 150, and z is a z-axis position signal of the two-dimensional grating 150. In mentioned expressions, the position signal equation of the x-axis direction and the z-axis direction of the two-dimensional grating 150 relates only with the data of the x-axis direction and the z-axis direction. Therefore, the position signal of the x-axis direction and the z-axis direction of the two-dimensional grating 150 can be calculated individually.

With reference to FIGS. 2 and 3, the linear stage 200 includes a guiding rail 210 and a moving stage 220, wherein the guiding rail 210 is firmly fixed, and the moving stage 220 is linearly moving along the guiding rail 210 by a driving apparatus (not shown in Figs.). In this embodiment, the two-dimensional grating 150 is disposed on the guiding rail 210, and the light source 110, the collimator lens 120, the polarization-splitting device 130, the first reflection device 140, the second reflection device 160, the focal lens 170 and the quadrant photodiode 180 are all disposed on the moving stage 220 to move following the movement of the moving stage 220. The incident light provided by the light source 110 moves along with the moving stage 220 when the moving stage 220 moves from a first position to a second position. Accordingly, the illuminating position of the incident light illuminates the two-dimensional grating 150 produces variation to make the intensity and angle of the reflection light that reflects from the two-dimensional grating 150 producing variation. After receiving the reflection light by the quadrant photodiode 180, the position and slope variance of the incident light illuminates the two-dimensional grating 150 are obtained from the position signal equation and the slope signal equation.

With reference to FIG. 1, in the step 12 of calculating a slope signal, a processor (not shown in Fig.) receives the sensing signals $I_1, I_2, I_3, I_4$ of the quadrant photodiode 180 and substitutes the mentioned sensing signals $I_1, I_2, I_3, I_4$ into the slope signal equation of the two-dimensional grating 150 for respectively calculating a slope signal $\theta_x$ of the x-axis direction and a slope signal $\theta_z$ of the z-axis direction of the two-dimensional grating 150, wherein the slope signals $\theta_x, \theta_z$ represent the sinusoidal signals that are variable along with position variance of the moving stage 220. The processor substitutes the sensing signals $I_1, I_2, I_3, I_4$ into the position signal equation of the two-dimensional grating 150 for respectively obtaining an initial position signal $x_1, z_1$ of the x-axis direction and the z-axis direction and an end position signal $x_2, z_2$ of the x-axis direction and the z-axis direction of the two-dimensional grating 150. The initial position signals $x_1, z_1$ are obtained by substituting the sensing signals $I_1, I_2, I_3, I_4$ into the position signal formula when the moving stage 220 is located at the first position. The end position signals are obtained by substituting the sensing signals $I_1, I_2, I_3, I_4$ into the position signal equation when the moving stage 220 is located at the second position.

Figure 6:
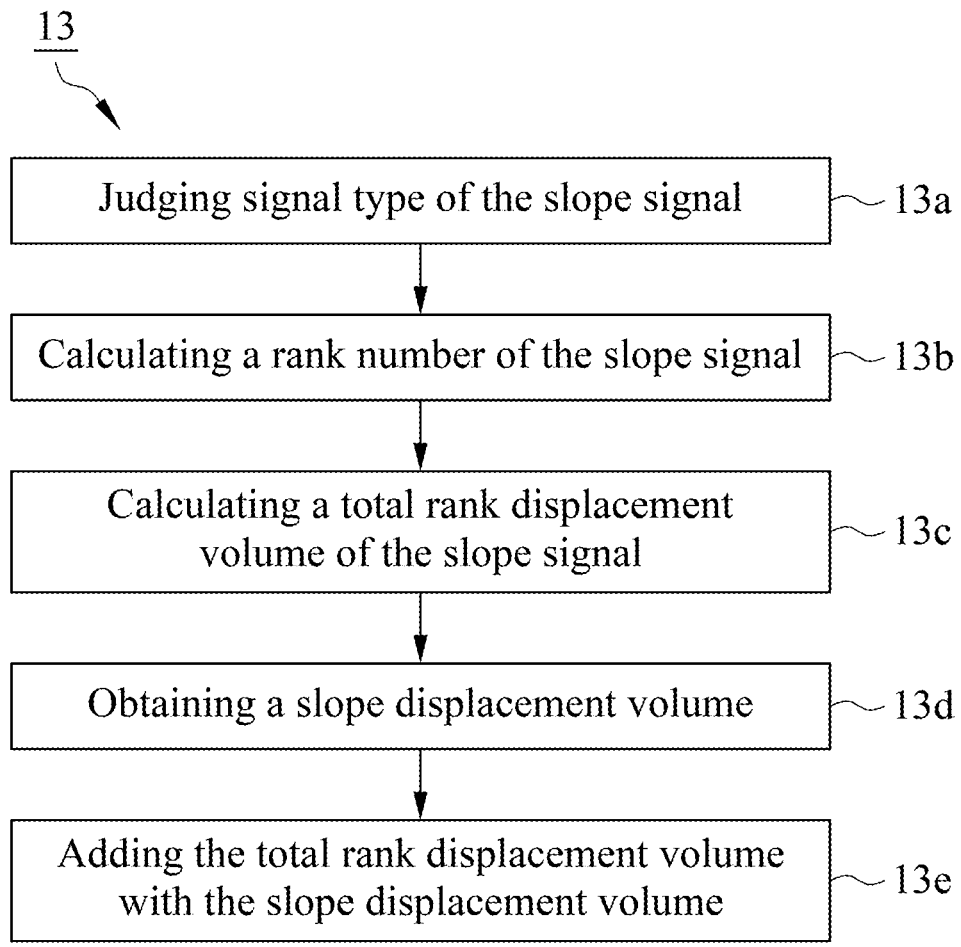
FIG. 6 is a flow diagram illustrating steps for obtaining displacement volume of linear stage in accordance with the embodiment of the present invention.

Referring to FIGS. 1 and 6, after obtaining the slope signals $\theta_x, \theta_z$ of the x-axis and the z-axis of the two-dimensional grating 150, the initial position signals $x_1, z_1$ and the end position signals $x_2, z_2$, performing a step 13 of obtaining a displacement volume of linear stage, wherein the processor obtains the displacement volume of the linear stage 200 based on the slope signals $\theta_x, \theta_z$, the initial position signals $x_1, z_1$ and the end position signals $x_2, z_2$. With reference to FIG. 6, the step 13 of obtaining a displacement volume of linear stage further includes: judging the signal type of the slope signal 13a; calculating a rank number of the slope signal 13b; calculating a total rank displacement volume of the slope signal 13c; obtaining a slope displacement volume 13d; and adding the total rank displacement volume with the slope displacement volume 13e.

Figure 7:
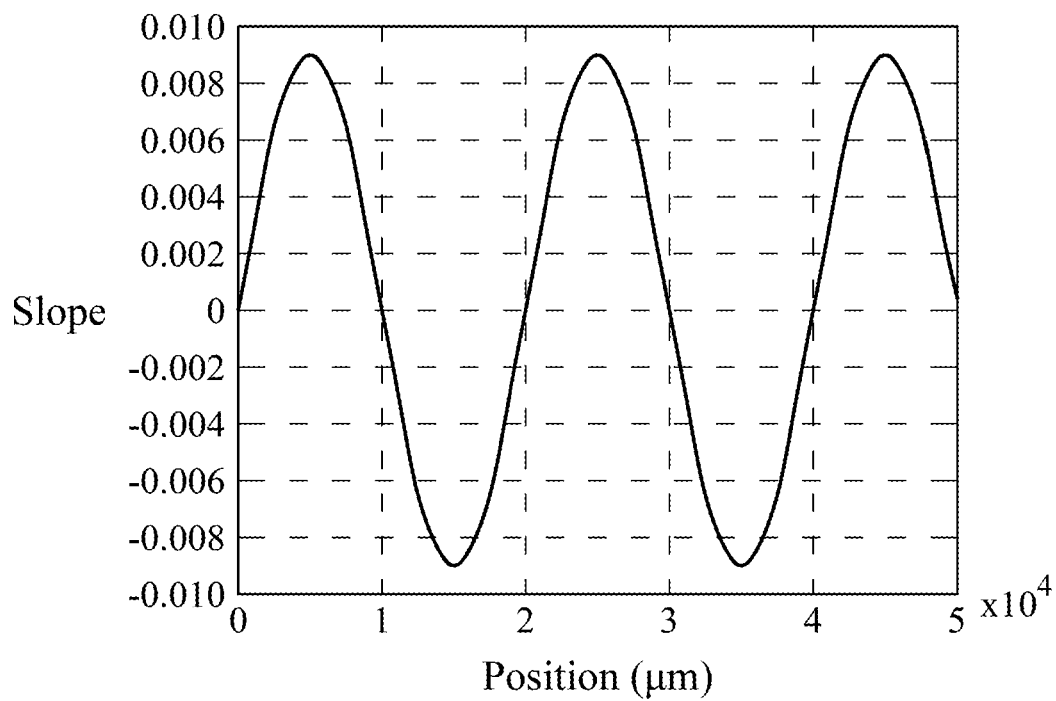
FIG. 7 is a signal diagram illustrating a slope signal of first type in accordance with the embodiment of the present invention.
Figure 8:
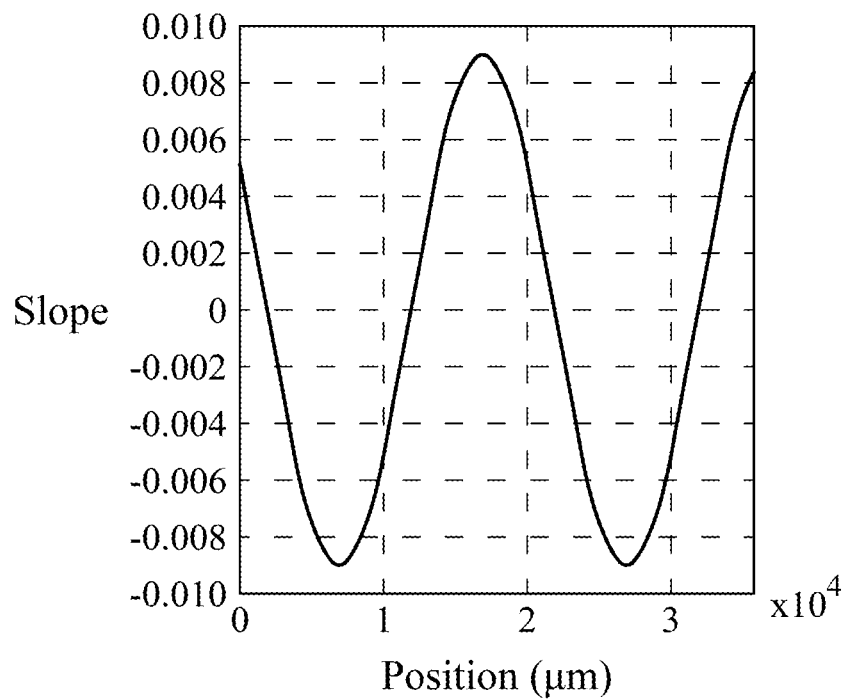
FIG. 8 is a signal diagram illustrating a slope signal of second type in accordance with the embodiment of the present invention.

With reference to FIG. 6, in the step 13a of judging the signal type of the slope signal, a signal type of the slope signal is judged by the processor based on a zero point number, a positive peak number and a negative peak number of the slope signal, wherein the slope signal is judged as first type when the zero point number is equal to summation of the positive peak number and the negative peak number; the slope signal is judged as second type when the zero point number is larger than summation of the positive peak number and the negative peak number; and the slope signal is judged as third type when the zero point number is smaller than summation of the positive peak number and the negative peak number. With reference to FIG. 7, in the waveform of the slope signal, for instance, the zero point number of the slope signal is 5, the positive peak number is 3, the negative peak number is 2, owing to 5=3+2, the slope signal is judged as first type. With reference to FIG. 8, in the waveform of the slope signal, for instance, the zero point number of the slope signal is 4, the positive peak number is 1, the negative peak number is 2, owing to 4>1+2, the slope signal is judged as second type.

With reference to FIG. 6, performing the step 13b of calculating a rank number of the slope signal after the step 13a of judging the signal type of the slope signal, the processor calculates a rank number of the slope signal based on the positive peak number, the negative peak number and the signal type of the slope signal, wherein the rank number is equal to 2×(positive peak number+negative peak number)−1 when the slope signal is first type; the rank number is equal to 2×(positive peak number+negative peak number) when the slope signal is second type; the rank number is equal to 2×(positive peak number+negative peak number−1) when the slope signal is third type. In the slope signal of FIG. 7, for example, the rank number of the slope signal is 2×(3+2)−1=9. In the slope signal of FIG. 8, for example, the rank number of the slope signal is 2×(1+2)=6, wherein the rank number represents the signal quantity of complete quarter period of slope signal.

With reference to FIG. 6, in the step 13c of calculating the total rank displacement volume of slope signal, the processor calculates the total rank displacement volume of slope signal based on the rank number of the slope signal, wherein the equation for calculating the total rank displacement volume of the slope signal is expressed as:

$$Tmd=Tm\times Order$$

Wherein Tmd is the total rank displacement volume, Tm is a rank displacement volume, wherein the rank displacement volume Tm=$P_{x,z}\times 180/4\pi$, $P_{x,z}$ are sinusoidal wavelengths of the two-dimensional grating 150, Order is the rank number of the slope number.

With reference to FIG. 6, in the step 13d of obtaining the slope displacement volume, the processor obtains the slope displacement volume based on the signal type of the slope signal congruent with the initial position signal and the end position signal, wherein the slope displacement volume=Tm+(end position signal−initial position signal) when the slope signal is first type and a first peak point of the slope signal locates prior to a first zero point; the slope displacement volume=Tm−(end position signal−initial position signal) when the slope signal is second type and the first peak point of the slope signal locates behind the first zero point; the slope displacement volume=(end position signal+initial position signal) when the slope signal is second type, the slope displacement volume=2Tm−(end position signal+initial position signal) when the slope signal is third type.

With reference to FIG. 6, eventually in the step 13e of adding the total rank displacement volume with the slope displacement volume, the displacement volume of the linear stage 200 is obtained through adding the total rank displacement volume with the slope displacement volume. Referring to FIGS. 2 and 3, summation of the total rank displacement volume and the slope displacement volume of the x-axis direction is exactly a axial motion displacement volume of the linear stage 200, and summation of the total rank displacement volume and the slope displacement volume in the z-axis direction is exactly a radial displacement volume of the linear stage 200. In this embodiment, the radial displacement volume is the displacement volume in vertical direction, or in other embodiment, the displacement volume in other direction is measured by relative position relationship between the two-dimensional grating 150 and the incident light. After obtaining the radial displacement volume of the linear stage 200, the straightness error of the linear stage 200 is obtained by analysis.

In present invention, the rank number of the slope signal is obtained by simple signal analysis, and the displacement volume of the linear stage 200 is obtained by congruent the rank displacement volume with the slope displacement volume corresponded to rank number of the slope signal. Owing to simplified and rapid calculation, the measuring method for linear stage is suitable to measure displacement and straightness error of the linear stage 200 on line therefore instantaneously controlling the linear stage 200 by information feedback.

While this invention has been particularly illustrated and described in detail with respect to the preferred embodiments thereof, it will be clearly understood by those skilled in the art that is not limited to the specific features shown and described and various modified and changed in form and details may be made without departing from the spirit and scope of this invention.

What is claimed is:

1. A measuring method for linear stage used for measuring displacement volume of a linear stage having a guiding rail and a moving stage includes:

providing a measurement device for linear stage, wherein the measurement device for linear stage comprises a light source, a two-dimensional grating, a quadrant photodiode and a processor, the light source and the quadrant photodiode are disposed on the moving stage, the two-dimensional grating is disposed on the guiding rail, wherein the light source provides an incident light traveled to the two-dimensional grating, the two-dimensional grating reflects the incident light to form a reflection light traveled to the quadrant photodiode for generating a plurality of sensing signals transmitted to the processor;

calculating a slope signal by substituting the sensing signals into a slope signal equation of the two-dimensional grating through the processor, and the processor utilizes the sensing signals to obtain an initial position signal and an end position signal by a position signal equation of the two-dimensional grating; and obtaining a displacement volume of the linear stage by the processor based on the slope signal, the initial position signal and the end position signal.

2. The measuring method for linear stage in accordance with claim 1, wherein the measurement device for linear stage further comprises a focal lens located between the two-dimensional grating and the quadrant photodiode, the focal lens is used for making the reflection light form a light spot focusing on the quadrant photodiode.

3. The measuring method for linear stage in accordance with claim 2, wherein the slope signal equation is expressed as:

$$\theta_x = \frac{1.22\pi\lambda S_j}{8D_Z}, \theta_Z = \frac{1.22\pi\lambda S_i}{8D_X},$$

wherein $\theta_x$ is an x-axis slope signal of the two-dimensional grating, $\lambda$ is a wavelength of the incident light, $S_j$ is a j-axis position of the light spot, $D_Z$ is a Z-axis diameter of the reflection light, $\theta_z$ is a z-axis slope signal of the reflection light, $S_i$ is a i-axis position of the light spot, and $D_X$ is an X-axis diameter of the incident light.

4. The measuring method for linear stage in accordance with claim 3, wherein the i-axis position of the light spot is $$S_i = \frac{I_2 + I_3 - I_1 - I_4}{I_1 + I_2 + I_3 + I_4},$$

wherein $I_1$ is the sensing signal sensed by a first-quadrant sensing unit of the quadrant photodiode, $I_2$ is the sensing signal sensed by a second-quadrant sensing unit of the quadrant photodiode, $I_3$ is the sensing signal sensed by a third-quadrant sensing unit of the quadrant photodiode, $I_4$ the sensing signal sensed by a fourth-quadrant sensing unit of the quadrant photodiode, wherein the j-axis position of the light spot is $$S_j = \frac{I_1 + I_2 - I_3 - I_4}{I_1 + I_2 + I_3 + I_4}.$$

5. The measuring method for linear stage in accordance with claim 4, wherein the two-dimensional grating is a reflective-type two-dimensional sinusoidal grating, a profile equation of the reflective-type two-dimensional sinusoidal grating is $$h(x, z) = -A_x \cos\left(\frac{2\pi x}{P_x}\right) - A_z \cos\left(\frac{2\pi z}{P_z}\right),$$

wherein h(x,z) is the profile equation of the reflective-type two-dimensional sinusoidal grating, $A_{x,z}$ are sinusoidal amplitudes of an x-axis direction and a z-axis direction of the reflective-typed two-dimensional sinusoidal grating separately, $P_{x,z}$ are sinusoidal wavelengths of the x-axis direction and the z-axis direction of the reflective-type two-dimensional sinusoidal grating separately.

6. The measuring method for linear stage in accordance with claim 5, wherein a position signal equation of the two-dimensional grating is $$x = \frac{P_x}{2\pi} \sin^{-1}\left(\frac{1.22\pi\lambda P_x S_i}{16\pi A_x D_X}\right), z = \frac{P_z}{2\pi} \sin^{-1}\left(\frac{1.22\pi\lambda P_z S_j}{16\pi A_z D_Z}\right),$$

wherein x is an x-axis position signal of the two-dimensional grating, z is a z-axis position signal of the two-dimensional grating.

7. The measuring method for linear stage in accordance with claim 1, wherein the steps of obtaining the displacement volume of the linear stage by the processor based on the slope signal, the initial position signal and the end position signal further include:
   judging signal type of the slope signal based on a zero point number, a positive peak number and a negative peak number of the slope signal;
   calculating a rank number of the slope signal based on the signal type, the positive peak number, the negative peak number and the signal type of the slope signal;
   calculating a total rank displacement volume of the slope signal based on the rank number of the slope signal;
   obtaining a slope displacement volume based on the signal type of the slope signal congruent with the initial position signal and the end position signal; and
   adding the total rank displacement volume with the slope displacement volume to obtain the displacement volume of the linear stage.

8. The measuring method for linear stage in accordance with claim 7, wherein in the step of judging the signal type of the slope signal, the slope signal is judged as first type when the zero point number is equal to summation of the positive peak number and negative peak number; the slope signal is judged as second type when the zero point number is larger than summation of the positive peak number and negative peak number; the slope signal is judged as third type when the zero point number is smaller than summation of the positive peak number and negative peak number.

9. The measuring method for linear stage in accordance with claim 8, wherein in the step of calculating the rank number of the slope signal, the rank number is equal to 2×(positive peak number+negative peak number)−1 when the slope signal is first type; the rank number is equal to 2×(positive peak number+negative peak number) when the slope signal is second type; the rank number is equal to 2×(positive peak number+negative peak number−1) when the slope signal is third type.

10. The measuring method for linear stage in accordance with claim 9, wherein a total rank displacement volume equation of the slope signal is expressed as Tmd=Tm×Order, wherein Tmd is the total rank displacement volume, Tm is a rank displacement volume, wherein the rank displacement volume Tm=$P_{x,z}$−180/47, wherein $P_{x,z}$ are sinusoidal wavelengths of an x-axis direction and a z-axis direction of the two-dimensional grating separately, Order is the rank number of the slope number.

11. The measuring method for linear stage in accordance with claim 10, wherein in the step of obtaining the slope displacement volume, the slope displacement volume=Tm+(end position signal−initial position signal) when the slope signal is first type and a first peak point of the slope signal locates prior to the first zero point; the slope displacement volume=Tm−(end position signal−initial position signal) when the slope signal is second type and the first peak point of the slope signal locates behind the first zero point; the slope displacement volume=(end position signal+initial position signal) when the slope signal is second type; the slope displacement volume=2Tm−(end-position signal+initial-position signal) when the slope signal is third type.

* * * * *